J. VALE.

Bake Oven.

No. 4,055.

Reissued June 28, 1870.

WITNESSES

Kingsbury Root

Angus. King

INVENTOR

Joseph Vale

N. PETERS, Photo-Lithographer, Washington, D. C.

United States Patent Office.

JOSEPH VALE, OF BELOIT, WISCONSIN.

*Letters Patent No.* 79,615, *dated July* 7, 1868; *reissue No.* 3,796, *dated January* 11, 1870; *reissue No.* 4,055, *dated June* 28, 1870.

DIVISION A.

OVEN.

The Schedule referred to in these Letters Patent and making part of the same.

I, JOSEPH VALE, of Beloit, in the county of Rock and State of Wisconsin, have invented certain Improvements in Rotary Bake-Ovens, of which the following is a specification.

The nature of my invention consists in providing a bake-oven with a rotating hearth, supported by an upright shaft resting upon a step at the bottom of the oven, and having a bearing through the top or arch of the oven.

*Description of the Accompanying Drawing.*

Figure 2 is a horizontal sectional view, taken on a line through the oven at the top of the fixed hearth.

*General Description.*

A represents the walls and body of the oven.

H, the revolving hearth and pivoted shaft, to which it is supported by suitable arms.

The revolving hearth is constructed of suitable material, supported by metallic arms, and the said revolving shaft has a suitable step-box, in which the lower end of said pivot may freely revolve.

Figure 3:
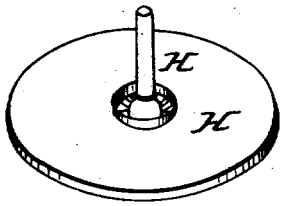
Figure 3 is a perspective view of the rotating hearth H and shaft H′, detached.

The said revolving hearth is rotated by inserting the pointed end of a spike or poker in the perforations in the turned-down edge or outer rim of the said revolving hearth H, of fig. 3, moving the same with convenient ease; or it may be turned by suitable gearing attached to the upright shaft H′, or by a lever and ratchet attached thereto.

Figure 1:
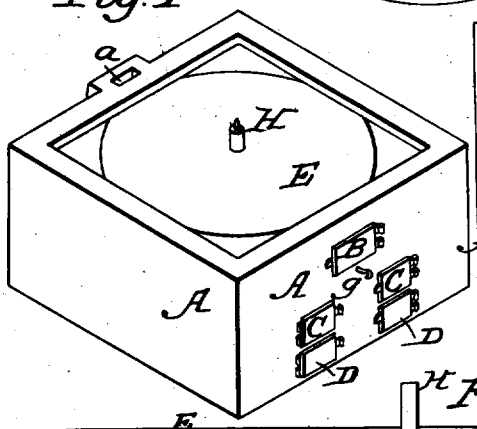
Figure 1 is a perspective view of the exterior of the oven.
Figure 3:
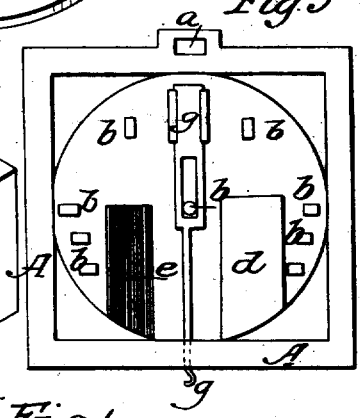
Figure 4:
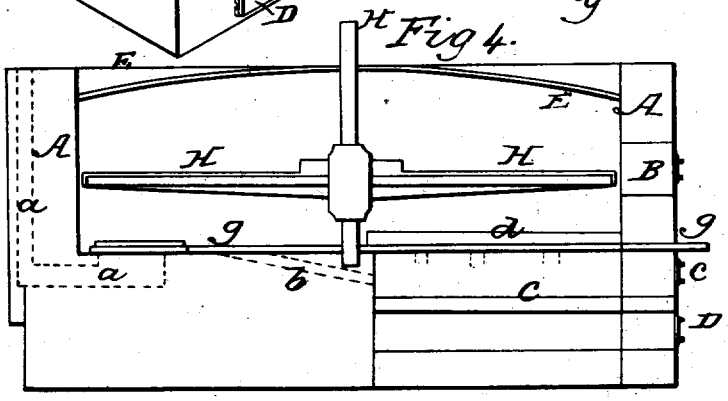
Figure 4 is a vertical section nearly through the center from front to rear of the oven.

C C are fire-grates, and the doors opening into the same, as shown in figs. 1, 2, and 4. C, fig. 2, shows one of the fire-grates having the iron cover removed, for the purpose of exhibiting its position.

D D are doors for regulating the draught of the furnaces, and withdrawing the ashes from under the grates.

J J are heavy iron covers for the fire-flues or furnaces, in the drawing, one of which is removed to show the fire-grate C, fig. 2.

*a a* is the smoke-flue or chimney.

*b b* are flues for admitting the heat, air, smoke, and gases from the fire into the baking-chamber directly under and around the rotating hearth.

*g* is a sliding damper, by the employment of which smoke and gases are allowed to escape through the flue or chimney *a a*, and is operated by the hook at *g*, fig. 2.

The crown E is made of brick in the ordinary manner, or it may be made of heavy sheet metal, as represented in the drawing, suitably supported by ribs or arms.

The upper end of the rotating shaft H′ is pivoted through the center of said crown E, and, if made of metal, said oval disk or crown is covered six or twelve inches deep with sand when in use, to prevent the escape of heat from the oven.

The furnace being directly under the fixed hearth, the heat is admitted to the oven directly, circulating under the rotating hearth, ascending by the spaces between the rim of said hearth and the wall of the oven; also, up through the opening round the shaft H′, pervading every part of the oven at the same time. The oven is operated, in baking, through the door B, fig. 1.

Batches of bread, &c., are placed upon the hearth H, successively, until one revolution has been made, when it will be found that those first placed thereon are sufficiently done to be removed.

I am aware that rotary ovens have been made before, and therefore do not claim broadly as such.

*Claims.*

I claim as my invention—

1. The rotating disk or hearth H, supported by the shaft H′, and revolved in any suitable manner, as and for the purpose specified.

2. The crown-plate or disk E, in combination with the fire-grates C C, covers *d d*, flues *b b*, regulating-damper *g*, flue or chimney *a a*, and ash-boxes D D, when the whole are constructed and arranged substantially as herein set forth, and described to operate as specified.

JOSEPH VALE.

Witnesses:

LEWIS L. COBURN,
HEINRICH F. BRUNS.